United States Patent
Yamada et al.

(10) Patent No.: US 10,588,082 B2
(45) Date of Patent: Mar. 10, 2020

(54) WIRELESS COMMUNICATION SYSTEM, WIRELESS COMMUNICATION NETWORK, WIRELESS TERMINAL, AND WIRELESS COMMUNICATION METHOD

(71) Applicant: NEC Corporation, Tokyo (JP)

(72) Inventors: Toru Yamada, Tokyo (JP); Akira Kamei, Tokyo (JP); Masahiro Serizawa, Tokyo (JP); Hotaka Sugano, Tokyo (JP); Satoshi Hasegawa, Tokyo (JP); Masashi Shimoma, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 88 days.

(21) Appl. No.: 15/559,627

(22) PCT Filed: Mar. 18, 2016

(86) PCT No.: PCT/JP2016/058792
§ 371 (c)(1),
(2) Date: Sep. 19, 2017

(87) PCT Pub. No.: WO2016/152806
PCT Pub. Date: Sep. 29, 2016

(65) Prior Publication Data
US 2018/0070309 A1 Mar. 8, 2018

(30) Foreign Application Priority Data
Mar. 23, 2015 (JP) .................................. 2015-059344

(51) Int. Cl.
*H04W 52/02* (2009.01)
*H04W 76/28* (2018.01)
(Continued)

(52) U.S. Cl.
CPC ......... *H04W 52/0216* (2013.01); *H04L 5/001* (2013.01); *H04W 4/38* (2018.02);
(Continued)

(58) Field of Classification Search
CPC ........... H04W 4/04; H04W 4/38; H04W 4/70; H04W 52/0216; H04W 72/042;
(Continued)

(56) References Cited

U.S. PATENT DOCUMENTS 8,767,604 B2 * 7/2014 Pelletier ............ H04W 52/0216
370/311
2011/0002281 A1 * 1/2011 Terry ................. H04W 52/0216
370/329
(Continued)

FOREIGN PATENT DOCUMENTS

| JP | 2012-089915 A | 5/2012 |
|---|---|---|
| WO | 2011040516 A1 | 4/2011 |
| WO | 2013110372 A1 | 8/2013 |

OTHER PUBLICATIONS

Communication dated Jun. 12, 2018 from the Japanese Patent Office in counterpart Japanese application No. 2017-508333.
(Continued)

*Primary Examiner* — Paul H Masur
(74) *Attorney, Agent, or Firm* — Sughrue Mion, PLLC

(57) ABSTRACT

A wireless communication system that enables a wireless terminal to perform communication using a plurality of component carriers having different frequencies. The wireless communication system monitors a communication state of each of the component carriers allocated to the wireless terminal; distributes, to the component carriers, data to be transmitted, based on the communication state of each of the component carriers; starts a reception operation at a predetermined timing in a non-reception period of a second cycle
(Continued)

during a discontinuous reception operation at the second cycle in some of the component carriers allocated to the wireless terminal, and performs the reception operation a predetermined number of times, the second cycle being longer than a first cycle.

13 Claims, 12 Drawing Sheets

(51) Int. Cl.
*H04L 5/00* (2006.01)
*H04W 4/38* (2018.01)
*H04W 72/04* (2009.01)
*H04W 88/02* (2009.01)

(52) U.S. Cl.
CPC ......... *H04W 72/042* (2013.01); *H04W 76/28* (2018.02); *H04L 5/0044* (2013.01); *H04W 88/02* (2013.01); *Y02D 70/00* (2018.01); *Y02D 70/126* (2018.01); *Y02D 70/1262* (2018.01); *Y02D 70/1264* (2018.01); *Y02D 70/21* (2018.01); *Y02D 70/24* (2018.01)

(58) Field of Classification Search
CPC ...... H04W 76/28; H04L 5/001; H04L 5/0044; Y02D 70/00; Y02D 70/126; Y02D 70/1262; Y02D 70/1264; Y02D 70/21; Y02D 70/24
See application file for complete search history.

(56) References Cited

U.S. PATENT DOCUMENTS

| | | | |
|---|---|---|---|
| 2012/0188903 A1* | 7/2012 | Futaki | H04W 52/0232 370/252 |
| 2012/0314635 A1* | 12/2012 | Lee | H04L 5/001 370/311 |
| 2015/0003311 A1* | 1/2015 | Feuersaenger | H04W 52/0225 370/311 |
| 2017/0188411 A1* | 6/2017 | Siomina | H04W 52/0216 |
| 2017/0215222 A1* | 7/2017 | Cheng | H04W 52/0206 |
| 2017/0339641 A1* | 11/2017 | Nigam | H04W 52/0216 |

OTHER PUBLICATIONS

3GPP TS 36.300 V9.0.0, "3rd Generation Partnership Project; Technical Specification Group Radio Access Network; Evolved Universal Terrestrial Radio Access (E-UTRA) and Evolved Universal Terrestrial Radio Access Network(E-UTRA); Overall description; Stage 2, (Release 9)", Jun. 2009, pp. 1-157.

3GPP TS 36.321 V8.6.0, "3rd Generation Partnership Project; Technical Specification Group Radio Access Network; Evolved Universal Terrestrial Radio Access (E-UTRA) Medium Access Control (MAC) protocol specification (Release 8)", Jun. 2009, pp. 1-47.

3GPP TR 36.814 V0.4.1, "3rd Generation Partnership Project; Technical Specification Group Radio Access Network; Further Advancements for E-UTRA Physical Layer Aspects (Release 9)", Feb. 2009, pp. 1-31.

Huawei, Hisilicon, "Further considerations on DRX enhancements", 3GPP TSG RAN WG1 Meeting #76bis, R1-141674, Mar. 31-Apr. 4, 2014, Shenzhen, China, 2 pages.

Research in Motion UK Limited, "DRX Operation for Carrier Aggregation", 3GPP TSG RAN WG2 Meeting #68, R2-096884, Nov. 9-13, 2009, Jeju, Korea, 5 pages.

International Search Report of PCT/JP2016/058792 dated May 24, 2016 [PCT/ISA/210].

* cited by examiner

WIRELESS COMMUNICATION SYSTEM, WIRELESS COMMUNICATION NETWORK, WIRELESS TERMINAL, AND WIRELESS COMMUNICATION METHOD

CROSS REFERENCE TO RELATED APPLICATIONS

This application is a National Stage of International Application No. PCT/JP2016/058792, filed Mar. 18, 2016, claiming priority based on Japanese Patent Application No. 2015-059344, filed Mar. 23, 2015, the contents of all of which are incorporated herein by reference in their entirety.

TECHNICAL FIELD

The present invention relates to a wireless communication system, a wireless communication network, a wireless terminal, and a wireless communication method.

BACKGROUND ART

3GPP LTE (Long Term Evolution), which is one of the next-generation cellular systems, supports a discontinuous reception (DRX) function for wireless terminals so as to reduce power consumption in each wireless terminal (NPL 1, 2). In the LTE, periods including a reception period (On-Duration), which is referred to as a DRX cycle, and a non-reception period (Opportunity for DRX) which follows the reception period, are defined. The DRX is implemented by repeating these periods.

Each wireless terminal is required to constantly receive a downlink control channel (PDCCH: Physical Downlink Control Channel) during the On-Duration period, and there is no need for the wireless terminal to receive the PDCCH during the period of Opportunity for DRX. If the wireless terminal is unsuccessful in receiving data during the On-Duration period and the data is re-transmitted after the On-Duration period, the period for receiving the PDCCH is extended.

A period in which the wireless terminal that is executing the DRX operation receives the PDCCH is referred to as an active time, and On-Duration is a minimum value of the active time. In addition, two DRX states (levels), "ShortDRX" and "LongDRX", which have different lengths of Opportunity for DRX, can be set for each wireless terminal. In the LTE, if a wireless terminal in a ShortDRX state does not receive data for a certain period, a DRX state control for causing the wireless terminal to transit to a LongDRX state is carried out. Further, a timer (drxShortCycleTimer) is used to determine the transition from ShortDRX to LongDRX. This makes it possible to set the DRX state (level) suitable for the data reception frequency of the wireless terminal, leading to a reduction in power consumption of the wireless terminal.

Further, standardization of the LTE-Advanced is currently carried out as a cellular system in which the functions of LTE are further improved. Among the functions of the LTE-Advanced, there is a carrier aggregation (CA) in which a plurality of component carriers (CCs) are used simultaneously for a data transmission/reception with a wireless terminal, as a function for improving a peak data rate for each wireless terminal (NPL 3). The term "CC" described herein refers to a basic frequency block necessary to implement communication between a wireless base station and a wireless terminal in the LTE. In the case of performing the CA, one transport block (a data transfer unit from a MAC layer to a PHY layer) is transmitted and received using a single CC, and signal processing is carried out independently in each of the CCs. Note that if there is a need to retransmit data and HARQ is performed, the CC used for the first transmission is the same as the CC used for the retransmission.

CITATION LIST

Non Patent Literature

NPL 1: 3GPP TS36.300v900 (Website: 3gpp.org/ftp/Specs/html-info/36300.htm)
NPL 2: 3GPP TS36.321v860 (Website: 3gpp.org/ftp/Specs/html-info/36321.htm)
NPL 3: 3GPP TR36.814v100 (Website: 3gpp.org/ftp/Specs/html-info/36814.htm)

SUMMARY OF INVENTION

Technical Problem

However, in the method for controlling the DRX cycles independently for each CC, if a period between an active time and another active time is in a long discontinuous reception state in some CCs, like in LongDRX, data cannot be received.

For example, FIG. 12 illustrates that CC1 out of CCs 1 to 3 is in the ShortDRX state. If CC2 and CC3 are in the LongDRX state, CC2 and CC3 cannot receive data until an active time is reached, which is inefficient.

On the other hand, it is not preferable to constantly perform a discontinuous reception in which the interval between an active time and another active time is short, like in ShortDRX, so as to reduce the power consumption in the wireless terminal.

The present invention has been made in view of the above-mentioned problems and an object of the present invention is to provide a wireless communication system, a wireless communication network, a wireless terminal, and a wireless communication method which are capable of achieving power saving in a wireless terminal, while a load among component carriers is distributed and the wireless terminal rapidly receives signals from a network.

Solution to Problem

One aspect of the present invention is a wireless communication system that enables a wireless terminal to perform communication using a plurality of component carriers having different frequencies, the wireless communication system including: monitoring means for monitoring a communication state of each of the component carriers allocated to the wireless terminal; distribution means for distributing, to the component carriers, data to be transmitted, based on the communication state of each of the component carriers; communication processing means for receiving data by each of the component carriers allocated to the wireless terminal; and communication control means for causing the communication processing means to start a reception operation at a predetermined timing in a non-reception period of a second cycle during a discontinuous reception operation at the second cycle in some of the component carriers allocated to the wireless terminal, and to perform the reception operation a predetermined number of times, the second cycle being longer than a first cycle.

Another aspect of the present invention is a wireless communication network in a wireless communication system that enables a wireless terminal to perform communication using a plurality of component carriers having different frequencies, the wireless communication network including: monitoring means for monitoring a communication state of each of the component carriers allocated to the wireless terminal; and distribution means for distributing, to the component carriers, data to be transmitted, based on the communication state of each of the component carriers.

Still another aspect of the present invention is a wireless terminal capable of performing communication using a plurality of component carriers having different frequencies, the wireless terminal including: communication processing means for receiving data by each of the component carriers allocated to the wireless terminal; and communication control means for causing the communication processing means to start a reception operation at a predetermined timing in a non-reception period of a second cycle during a discontinuous reception operation at the second cycle in some of the component carriers allocated to the wireless terminal, and to perform the reception operation a predetermined number of times, the second cycle being longer than a first cycle.

Still one more aspect of the present invention is a wireless communication method that enables a wireless terminal to perform communication using a plurality of component carriers having different frequencies, the wireless communication method including: monitoring, by a wireless communication network, a communication state of each of the component carriers allocated to the wireless terminal; distributing, by the wireless communication network, data to be transmitted, to the component carriers, based on the communication state of each of the component carriers and transmitting the data distributed to the component carriers; and starting, by the wireless terminal, a reception operation at a predetermined timing in a non-reception period of a second cycle during a discontinuous reception operation at the second cycle in some of the component carriers allocated, and performing the reception operation a predetermined number of times, the second cycle being longer than a first cycle.

Advantageous Effects of Invention

According to the present invention, it is possible to achieve power saving in a wireless terminal while a load among component carriers is distributed and the wireless terminal rapidly receives signals from a network.

DESCRIPTION OF EMBODIMENTS

Figure 1:
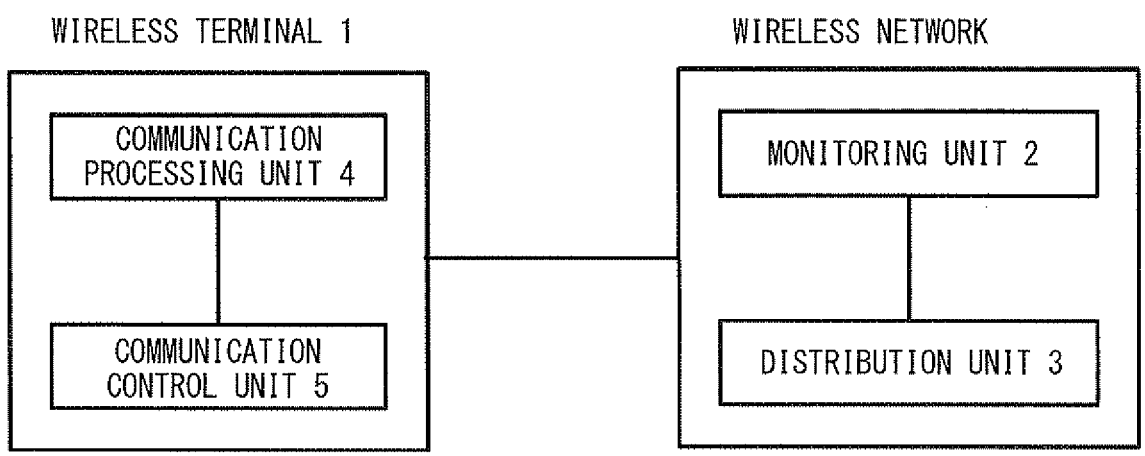
FIG. 1 is a block diagram according to the present invention.

An outline of the present invention will be described. FIG. 1 is a block diagram according to the present invention.

As shown in FIG. 1, the present invention is directed to a wireless communication system that enables a wireless terminal 1 to perform communication using a plurality of component carriers having different frequencies, the wireless communication system including: a monitoring unit 2 that monitors a communication state of each of the component carriers allocated to the wireless terminal 1; a distribution unit 3 that distributes, to the component carriers, data to be transmitted, based on a communication state of each of the component carriers; a communication processing unit 4 that receives data by each of the component carriers allocated to the wireless terminal 1; and a communication control unit 5 that causes the communication processing unit 4 to start a reception operation at a predetermined timing in a non-reception period of a second cycle during a discontinuous reception operation of the second cycle in some of the component carriers allocated to the wireless terminal 1, and to perform the reception operation a predetermined number of times, the second cycle being longer than a first cycle. Note that the monitoring unit 2 and the distribution unit 3 are provided in, for example, a wireless communication network, and the communication processing unit 4 and the communication control unit 5 are provided in, for example, the wireless terminal 1.

As for the component carriers to be controlled in the present invention, all the component carriers allocated to the wireless terminal 1, or predetermined specific carriers may be used. Further, the component carriers allocated to the wireless terminal may be divided into some groups and control may be performed for each group.

Note that the component carriers allocated to the wireless terminal 1 are component carriers designated (configured or activated) by a wireless base station when there is a possibility that data may be transmitted to the wireless terminal 1, and/or component carriers for receiving (or which need to receive) a predetermined channel for the wireless terminal 1 to receive data. A plurality of component carriers having different frequencies may also be referred to as a carrier set. Further, the communication can also be considered as data transmission and/or data reception.

As cycles of a reception start timing, at least two cycles of the reception start timing with different cycle lengths are used.

For example, the communication control unit 5 of the wireless terminal 1 transits to the cycle of the reception start timing, which is longer than the cycle of the current reception start timing, when no new data is received in a predetermined period in at least some of the component carriers allocated to the wireless terminal 1. This example will be described with reference to FIG. 2.

Figure 2:
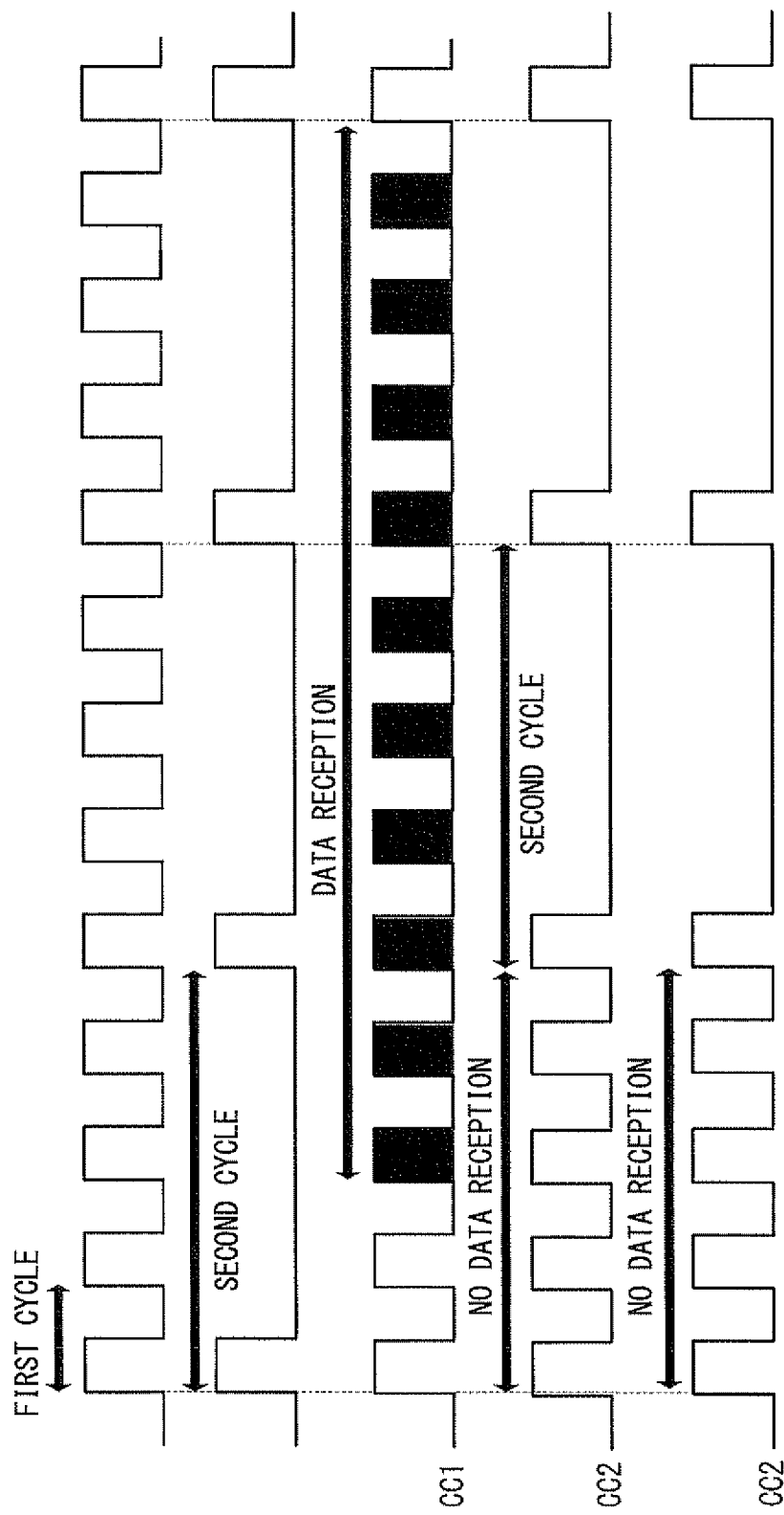
FIG. 2 is a diagram for explaining a wireless communication system according to the present invention.

FIG. 2 shows that the component carriers to be controlled among the component carriers allocated to the wireless terminal 1 are component carriers (CCs) 1, 2, and 3. Each of the component carriers (CCs) 1, 2, and 3 receives signals transmitted in a predetermined channel at one of a reception start timing of a first cycle, or a reception start timing of a second cycle, which is longer than the first cycle. In this case, each of the component carriers (CCs) 1, 2, and 3 starts the reception of signals transmitted in the predetermined channel at a first reception start timing of the first cycle. ShortDRX is a typical example of the first cycle, and LongDRX is a typical example of the second cycle.

For each of the component carriers (CCs) 1, 2, and 3, the measurement of a predetermined period is started after the reception of data that is transmitted in the predetermined channel or that is transmitted in a manner associated with the signals that have been transmitted in the predetermined channel, for example, after decoding the data accurately. The measurement is made using a general timer or the like, but the type of the timer is not limited, as long as it is recognized that a predetermined period, such as count-up or count-down, has expired. Further, the measurement may be started after data retransmission control (in this case, reception processing) is completed, instead of starting the measurement after decoding data accurately.

When a predetermined component carrier among the component carriers (CCs) 1, 2, and 3 has not received data for a certain period, the component carrier receives data at a second reception start timing of the second cycle which is longer than the cycle of the first reception start timing. FIG. 2 shows a case where when the component carriers (CCs) 2 and 3 among the component carriers (CCs) 1, 2, and 3 have not received data for a certain period, the component carriers (CCs) 2 and 3 receive data at the reception start timing of the second cycle which is longer than the first cycle.

Figure 3:
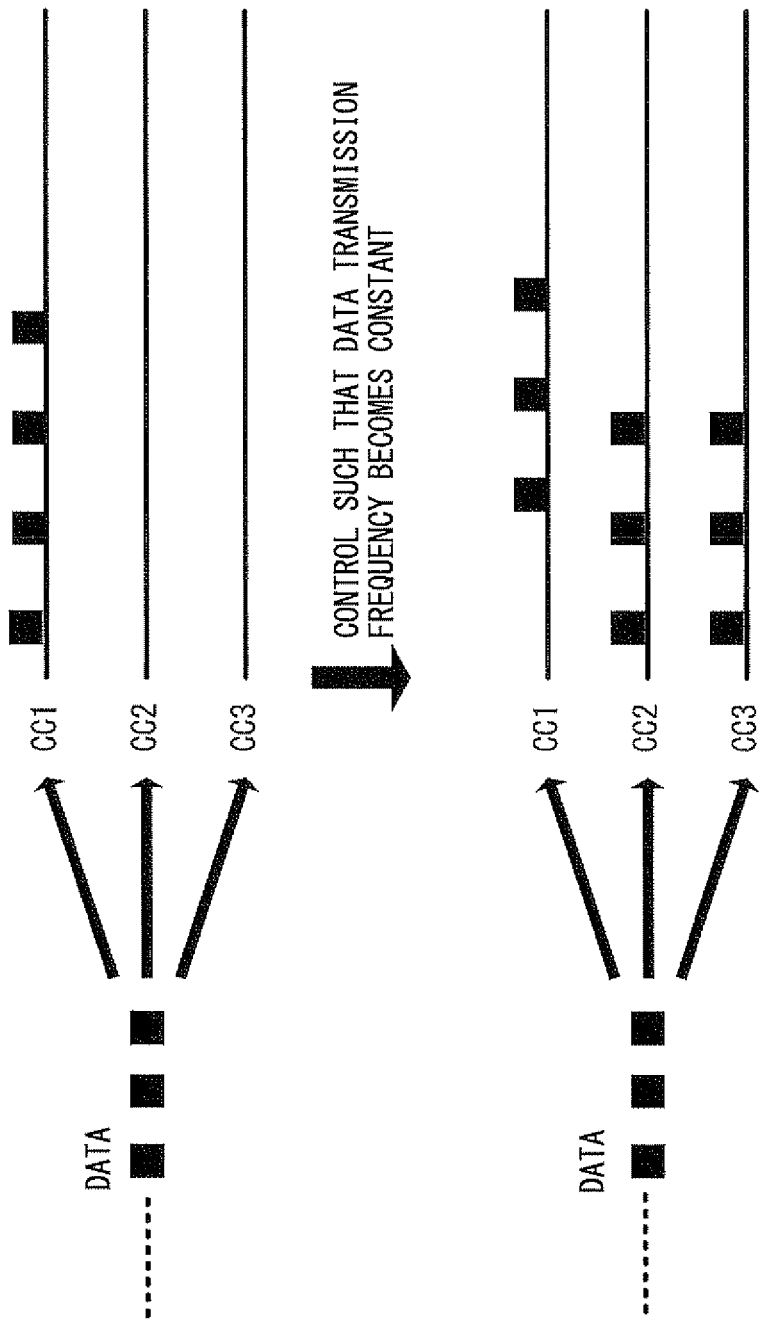
FIG. 3 is a diagram for explaining an operation performed by a network.

Next, the wireless communication network will be described. FIG. 3 is a diagram for explaining an operation performed by the network.

The monitoring unit 2 monitors the communication state of each of the component carriers allocated to the wireless terminal 1, and transmits the monitoring result to the distribution unit 3. The communication state described herein refers to, for example, a data transmission frequency, a communication load, or a communication quality.

The distribution unit 3 receives the communication state of each component carrier from the monitoring unit 2, and distributes data to be transmitted, to the component carriers. For example, when the communication state indicates a data transmission frequency, data is transmitted by preferentially using available component carriers so that the component carriers allocated to the wireless terminal 1 have the same data transmission frequency. For example, in FIG. 3, data is transmitted by preferentially using the component carriers (CCs) 2 and 3 so that the component carriers (CCs) 1, 2, and 3 have the same data transmission frequency.

When the communication state indicates a communication load, data is transmitted by preferentially using component carriers with a small load so that the component carriers allocated to the wireless terminal 1 have the same communication load.

When the communication state indicates a communication quality, data is transmitted by preferentially using component carriers with a high communication quality so that the component carriers allocated to the wireless terminal 1 have the same communication quality.

Figure 4:
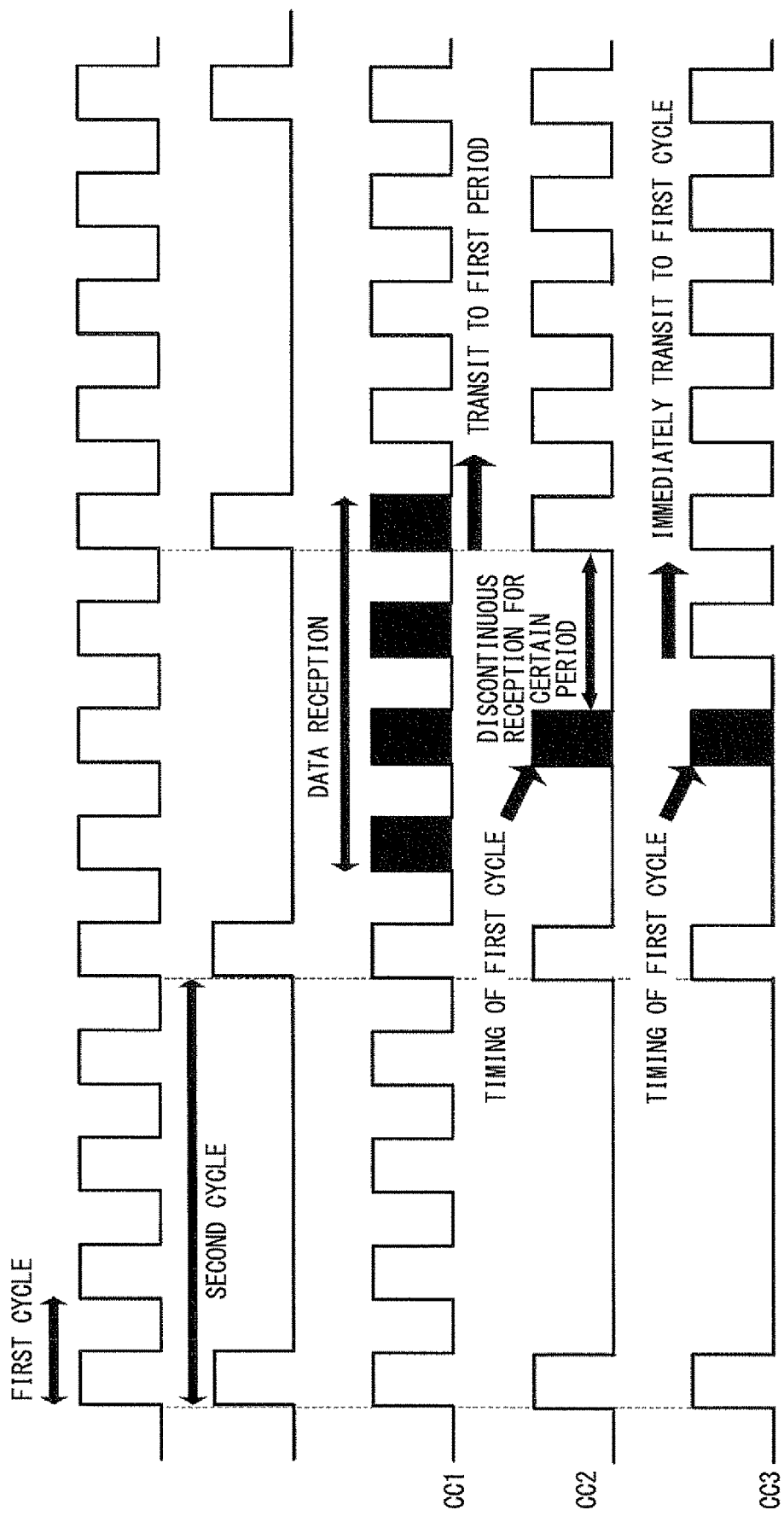
FIG. 4 is a diagram for explaining the wireless communication system according to the present invention.

On the other hand, in the wireless terminal 1, as described above, the component carriers (CCs) 2 and 3 perform the discontinuous reception operation at the second cycle, and thus can receive data distributed to the component carriers only at the reception start timing of the second cycle. Accordingly, as shown in FIG. 4, the communication control unit 5 causes the communication unit 1 to perform the reception operation for a certain period at a cycle shorter than the second cycle and at a predetermined timing of a non-reception period of the second cycle when the communication processing unit 1 performs the discontinuous reception operation at the second cycle in the component carriers (CCs) 2 and 3.

In this case, the predetermined timing of the non-reception period of the second cycle may be a desired timing, or a predetermined timing. Examples of the predetermined timing include a synchronous timing of the first cycle, and a timing when the non-reception period of the second cycle before the timing and that after the timing are constant (for example, a timing in the vicinity of the center of the non-reception period of the second cycle).

As for the number of times of reception operation in the non-reception period of the second cycle (the number of times of activating the reception operation), the reception operation may be performed only once in the non-reception period of the second cycle, or may be performed a plurality of times in the non-reception period of the second cycle. However, when the reception operation is performed a plurality of times, the reception operation is performed at a cycle shorter than the second cycle. Further, when the reception operation is performed a plurality of times, it is preferable that the non-reception period of the second cycle before the reception operation and that after the reception operation be constant, as described above. For example, when the reception operation is performed twice in the non-reception period of the second cycle, the reception operation is performed at a cycle when the reception operation is activated at a timing in the vicinity of one third or two thirds of the non-reception period of the second cycle. Thus, the non-reception periods before and after the timing are constant.

Further, as for the reception operation in the non-reception period of the second cycle, the reception operation may be performed only for the non-reception period of the first cycle in the second cycle, or the reception operation may be performed at certain intervals of the non-reception period of the second cycle.

Further, when data is received during the reception operation in the non-reception period of the second cycle, the cycle transits to the first cycle, which is a shorter cycle, after the data reception operation, and the discontinuous reception operation is performed. In this case, when data is received during the reception operation in the non-reception period of the second cycle, the cycle may transit to the first cycle after the end of the non-reception period of the second cycle (for example, the component carrier (CC) 2 shown in FIG. 4), or the cycle may transit to the first cycle immediately after the reception of data (for example, the component carrier (CC) 3 shown in FIG. 4).

Figure 5:
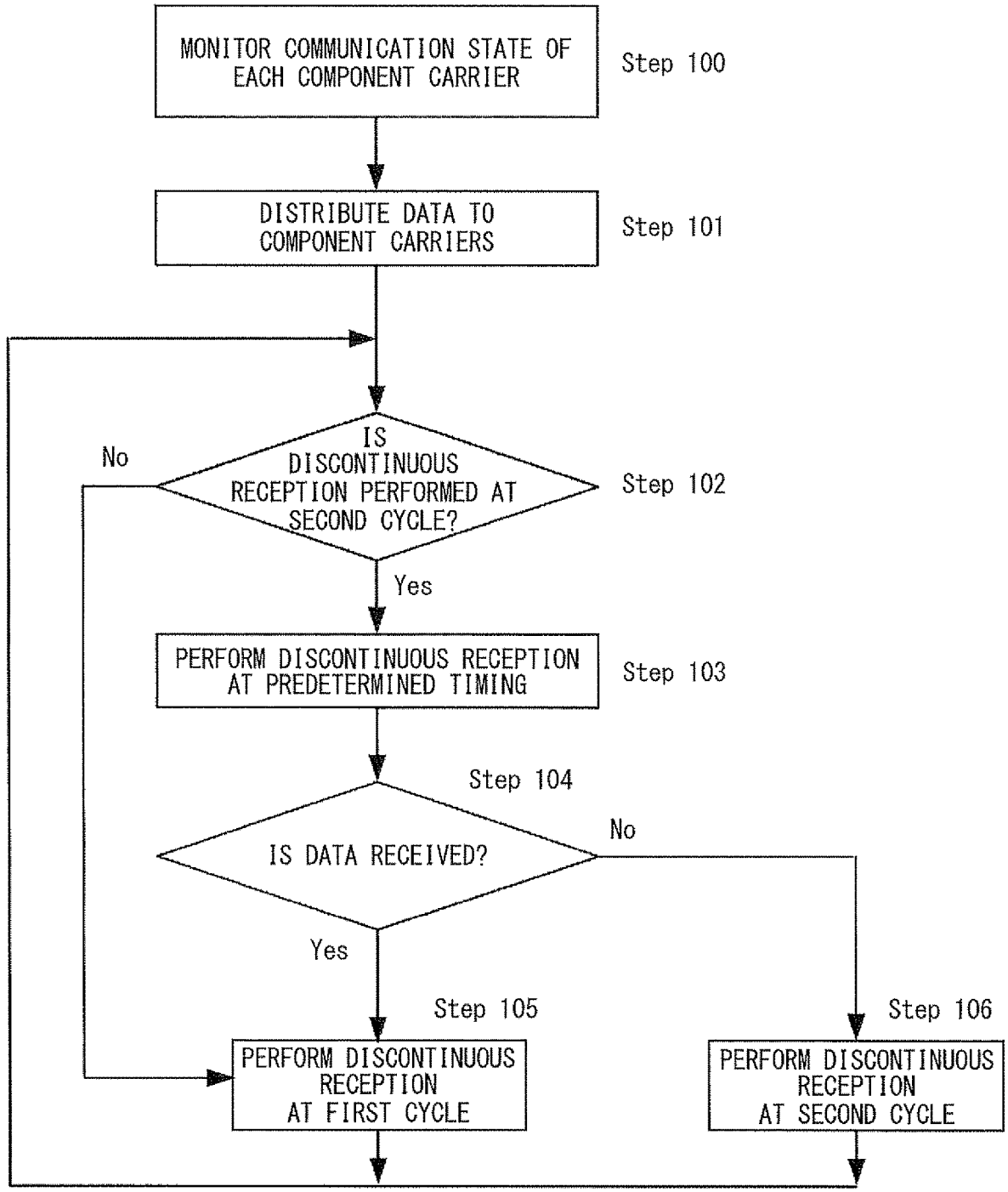
FIG. 5 is a flowchart showing an operation according to the present invention.

The above-described operation will be described with reference to the flowchart of FIG. 5.

First, the monitoring unit 2 monitors the communication state of each of the component carriers allocated to the wireless terminal 1 (Step 100). Further, the monitoring result is transmitted to the distribution unit 3.

The distribution unit 3 receives the communication state of each component carrier from the monitoring unit 2, and distributes data to be transmitted, to the component carriers. For example, data is transmitted by preferentially using available component carriers so that the component carriers allocated to the wireless terminal 1 have the same data transmission frequency (Step 101).

The communication control unit 5 of the wireless terminal 1 determines the cycle of the discontinuous reception operation of each component carrier (Step 102). When the discontinuous reception operation is performed at the second cycle, the communication processing unit 1 is caused to perform the reception operation for a certain period at a predetermined timing (Step 103). Upon receiving data during the reception operation in the component carriers (Step 104), the communication control unit 5 performs the discontinuous reception operation at the first cycle to receive data (Step 105). When no data is received (Step 104), the communication control unit performs the discontinuous reception operation at the second cycle to receive data (Step 106).

Note that the control (the operation start timing, the number of times of the reception operation, and the determination of the reception operation) for the reception operation performed in the non-reception period of the second cycle by the communication control unit 5 described above, the control performed after the reception operation in the non-reception period of the second cycle, and the like may be preliminarily set to the communication control unit 5, or may be instructed from a network, such as a base station.

The type of the wireless terminal is not limited. Examples of the type of the wireless terminal include a wireless terminal (UE: User Equipment) as typified by a smartphone or a cellular phone, and a PC, as well as an MTC (Machine Type Communication) terminal, an M2M (Machine-to-Machine) terminal, and a device, a sensor, or the like used for IoT (Internet of Things).

Thus, power saving in the wireless terminal can be achieved while a load among the component carriers in the wireless communication network is distributed and the wireless terminal rapidly receives signals from the network.

Next, embodiments of the present invention will be described in detail with reference to the drawings. Note that in the following embodiments, "3GPP LTE (Long Term Evolution)" is assumed as a wireless communication system (cellular system). An example in which the communication state indicates a data transmission frequency will be described.

Figure 6:
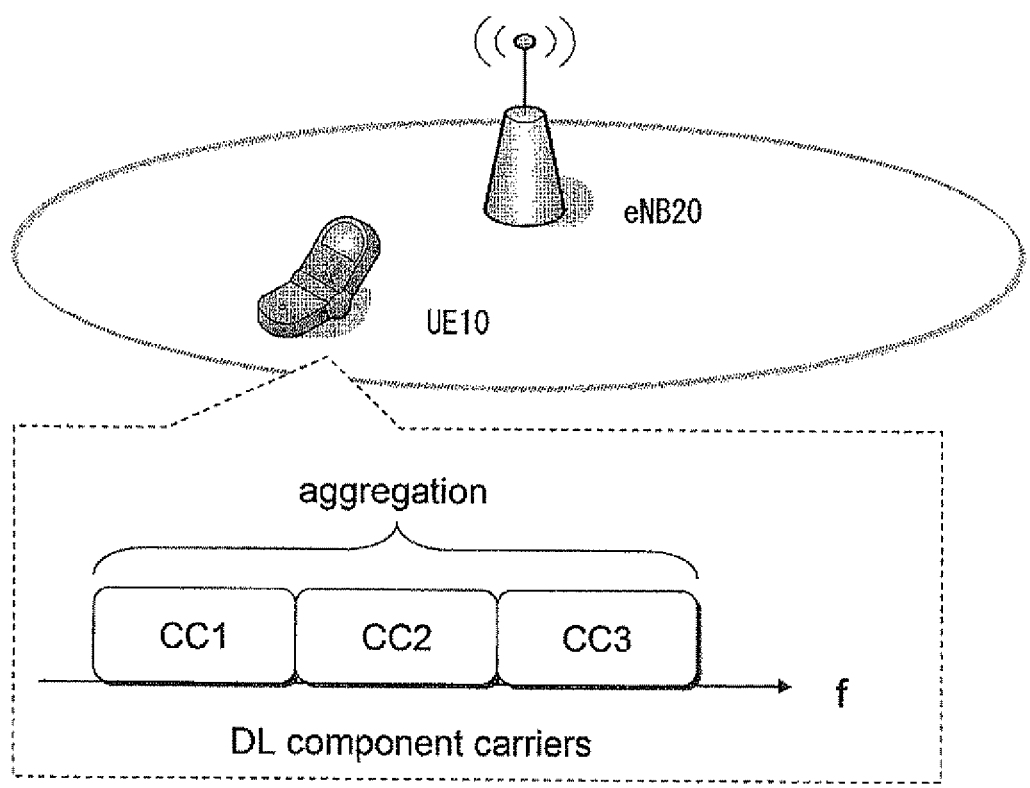
FIG. 6 is a diagram showing an example of a schematic configuration of a wireless communication system according to an embodiment of the present invention.

FIG. 6 is a diagram showing an example of a schematic configuration of a wireless communication system according to an embodiment of the present invention.

The wireless communication system according to the present embodiment includes a wireless terminal (UE: User Equipment) UE 10, and a wireless base station (eNB: evolved NodeB) eNB 20. In this case, the UE 10 has established a connection (RRC Connection) for communication with the eNB 20. Also assume that the component carriers CC1 to CC3 are allocated as the component carriers (CCs) capable of carrier aggregation (CA) and the component carriers CC1 to CC3 can receive data simultaneously.

Note that the frequencies of the component carriers CC1 to CC3 may be continuous or discontinuous, and the component carriers may be in different frequency bands. Further, the eNB 20 notifies the UE 10 of a discontinuous reception (DRX) parameter, and the UE 10 performs settings (for example, setting of an expiration value of a DRX-related timer) according to the parameter. At this time, the DRX parameter is common among the component carriers CC1 to CC3.

Figure 7:
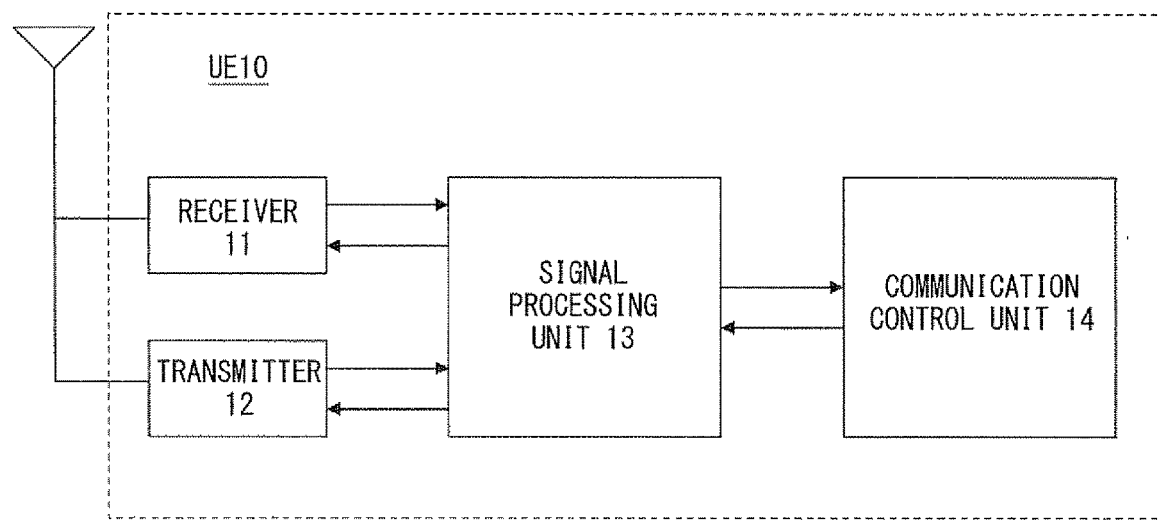
FIG. 7 is a block diagram showing a wireless terminal (UE) 10 in the wireless communication system according to the present embodiment.

FIG. 7 is a block diagram showing the wireless terminal (UE) 10 in the wireless communication system according to the present embodiment.

In FIG. 7, the UE 10 includes a receiver 11, a transmitter 12, a signal processing unit 13, and a communication control unit 14.

Each of the receiver 11 and the transmitter 12 is a unit that receives radio signals from the eNB 20 and transmits radio signals therefrom. The signal processing unit 13 is a unit that generates a radio signal for transmitting certain information to the eNB, and restores original information from the received radio signal. The communication control unit 14 is a unit that instructs the signal processing unit 13 to, for example, generate a signal to be transmitted, or restore information. The DRX control for the UE 10 is also managed by the communication control unit 14.

Figure 8:
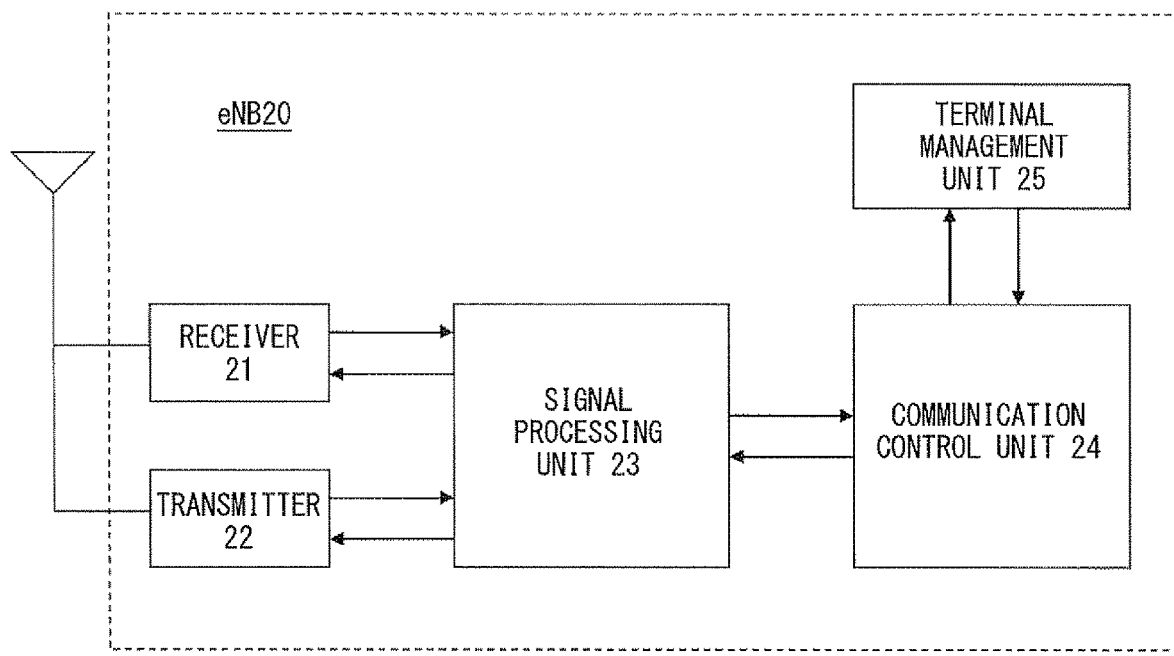
FIG. 8 is a block diagram showing a wireless base station (eNB) 20 according to the present embodiment.

FIG. 8 is a block diagram showing the wireless base station (eNB) 20 according to the present embodiment.

In FIG. 8, the eNB 20 includes a receiver 21, a transmitter 22, a signal processing unit 23, a communication control unit 24, and a terminal management unit 25. The receiver 21, the transmitter 22, the signal processing unit 23, and the communication control unit 24 have functions that are basically similar to those of the UE 10. The terminal management unit 25 individually manages a plurality of UEs.

Figure 9:
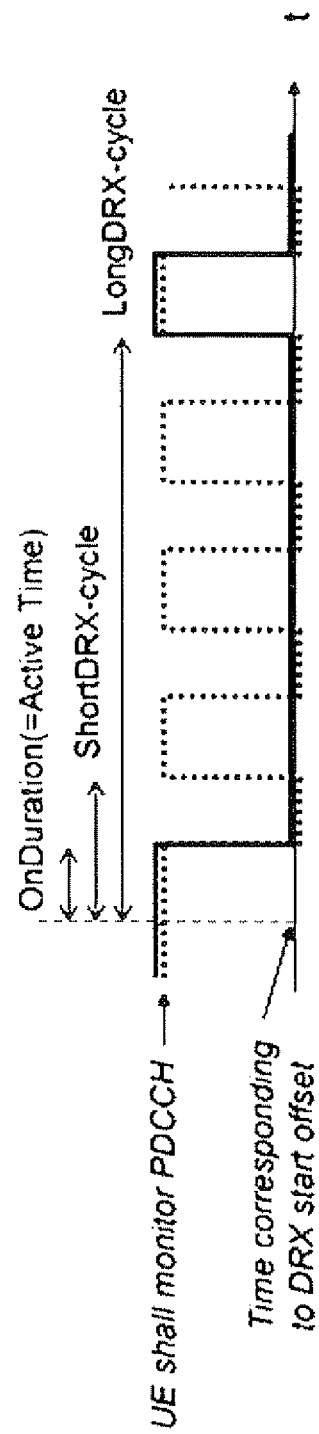
FIG. 9 is a diagram showing a discontinuous reception (DRX) operation of a wireless terminal in the wireless communication system according to the present embodiment.

FIG. 9 is a diagram showing a discontinuous reception (DRX) operation of the wireless terminal in the wireless communication system according to the present embodiment.

First, as shown in FIG. 9, a DRX cycle, which is a discontinuous reception cycle, includes a period (On-Duration) in which a downlink control channel PDCCH (Physical Downlink Control Channel) needs to be continuously received, and a period (Opportunity for DRX) in which there is no need to receive the PDCCH. Note that the former period is also referred to as a wake-up period, and the latter period is also referred to as a sleep period. The latter period may be a period in which the PDCCH is not received, or a period in which the PDCCH is prohibited from being received.

Note that data is transmitted in a PDSCH (Physical Downlink Shared Channel), and the PDCCH includes schedule information about the PDSCH. Accordingly, after the PDCCH is received and scheduling information is detected, data designated by the scheduling information can be received.

There are two DRX cycles, i.e., ShortDRX and LongDRX. On-Duration of ShortDRX is the same as On-Duration of LongDRX. The length of a period other than On-Duration in ShortDRX in which the PDCCH need not be received is different from that in LongDRX. The interval of On-Duration in ShortDRX is set to be shorter than the interval of On-Duration in LongDRX. Note that in the LTE, there is a limitation that LongDRX is an integral multiple of ShortDRX. As for the length of each On-Duration and DRX cycle, for example, there are a dozen possible sets of On-Duration in a range from 1 ms to 200 ms, and there are a dozen possible sets of ShortDRX and LongDRX of the DRX cycle in a range from 2 ms (minimum ShortDRX) to 2560 ms (maximum LongDRX).

Thus, there are two DRX states called ShortDRX and LongDRX, respectively. ShortDRX corresponds to the first cycle in the present invention and LongDRX corresponds to the second cycle in the present invention.

Basically, first, the state starts from ShortDRX, and if data has not received for a certain period, the state transits to LongDRX.

Next, in the present embodiment, the communication control unit 24 monitors the data transmission frequency of each of the component carriers CC1 to CC3 allocated to the UE 10. Based on the monitoring result, for example, data is transmitted by preferentially using available component carriers so that the component carriers CC1 to CC3 allocated to the UE 10 have the same data transmission frequency.

On the other hand, the communication control unit 14 of the UE 10 performs control in such a manner that the wake-up period is provided at a cycle shorter than the cycle of LongDRX at a predetermined timing in the sleep period of LongDRX.

Figure 10:
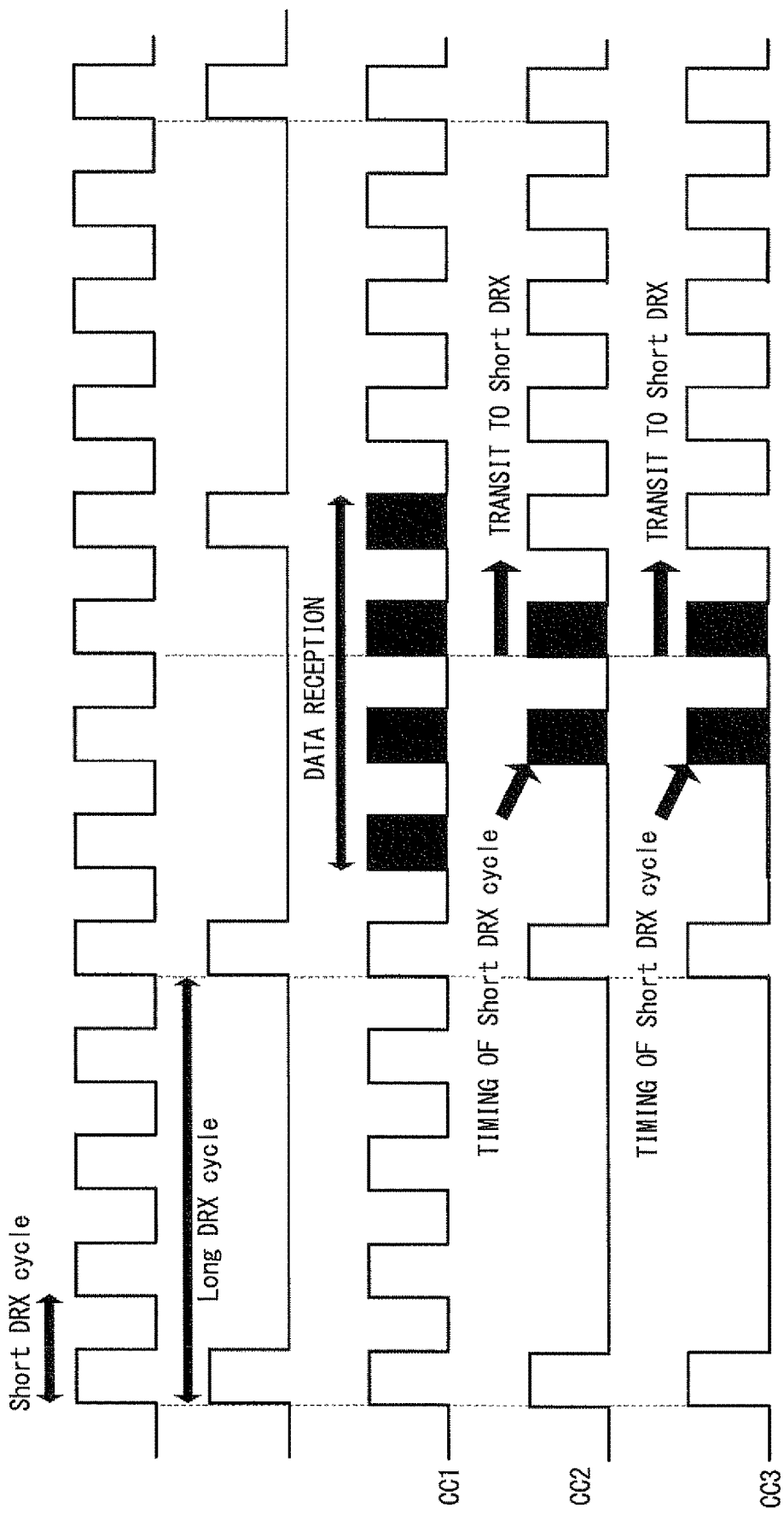
FIG. 10 is a diagram for explaining a DRX control operation performed by a communication control unit 14 of the UE 10.

FIG. 10 is a diagram for explaining a DRX control operation performed by the communication control unit 14 of the UE 10.

In FIG. 10, in the sleep period of LongDRX, one wake-up is provided at the wake-up timing of ShortDRX.

In the component carriers CC2 and CC3, as described above, data is transmitted in such a manner that not only the component carrier CC1, but also the component carriers CC1 to CC3 have the same data transmission frequency. Further, in the component carriers CC2 and CC3, wake-up is provided in the sleep period of LongDRX, which makes it possible to receive the data. When the data is received, it is highly likely that data is subsequently received, and thus the state is immediately caused to transit from LongDRX to ShortDRX. In the example shown in FIG. 10, data is received during wake-up of each of the component carriers CC2 and CC3, and thus the state is immediately caused to transit from LongDRX to ShortDRX. On the other hand, when data is not received during wake-up in the sleep period of LongDRX in one of the component carriers CC2 and CC3, LongDRX is continued.

Figure 11:
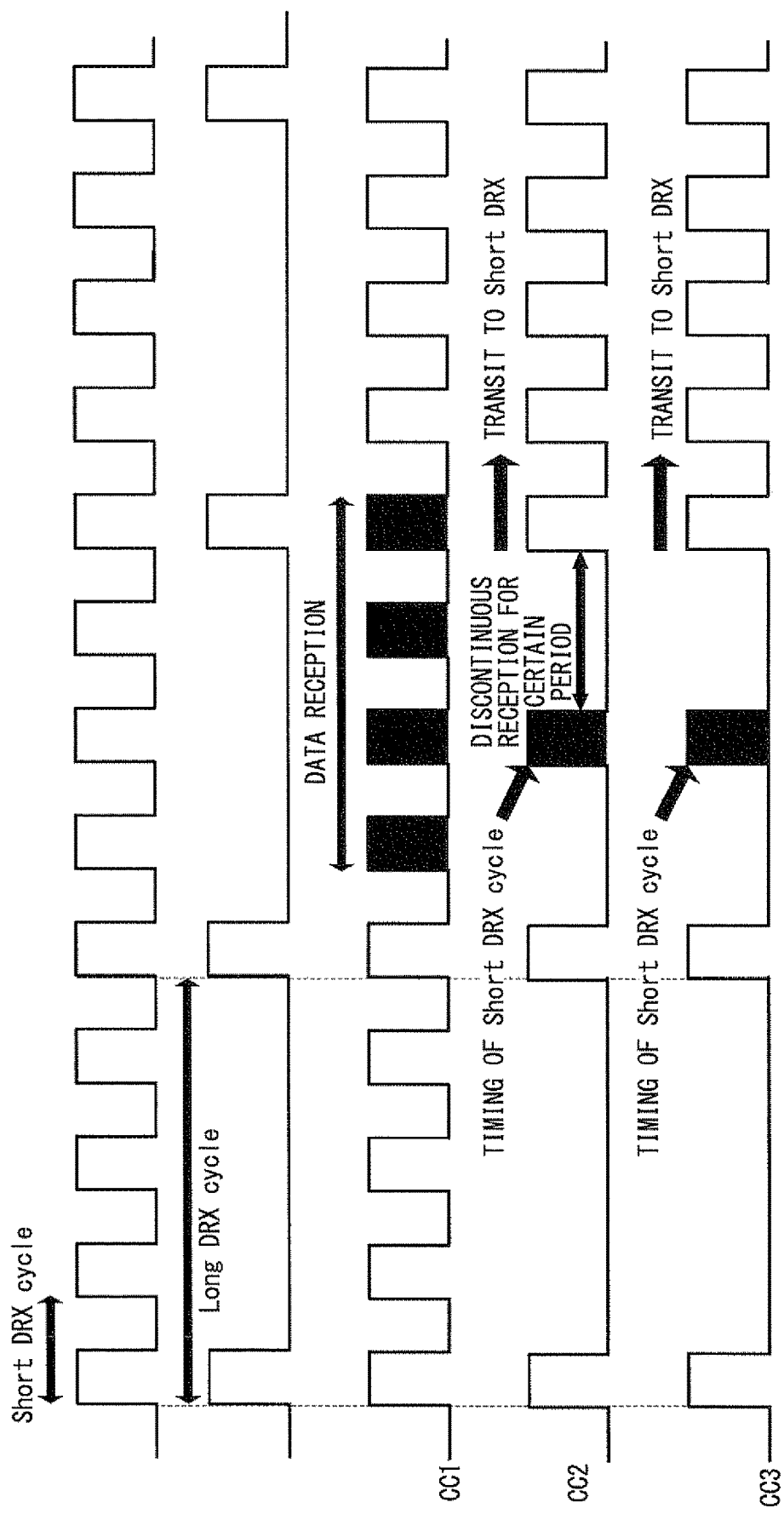
FIG. 11 is a diagram for explaining the DRX control operation performed by the communication control unit 14 of the UE 10.
Figure 12:
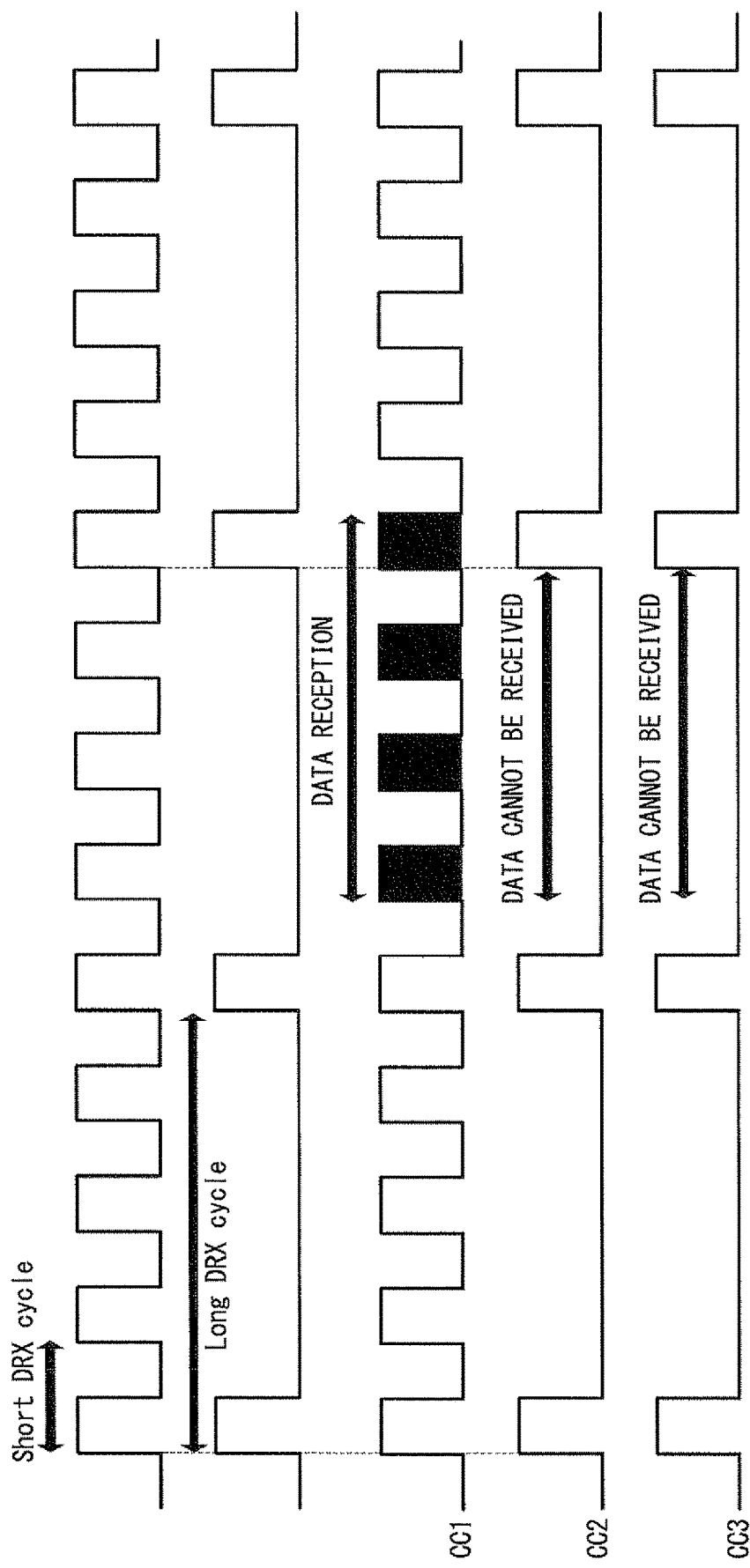
FIG. 12 is a diagram for explaining the background art.

Note that the example of FIG. 10 described above illustrates a case where, when data is received during wake-up in the sleep period of LongDRX, the DRX timer is reset and the state is immediately caused to transit to ShortDRX. However, as shown in FIG. 11, when data is received during wake-up in the sleep period of LongDRX, the state may be caused to transit to ShortDRX after the end of LongDRX, without resetting the DRX timer.

According to the present embodiment, power saving in the UE 10 can be achieved while the load among the component carriers in the wireless communication network is distributed and the UE 10 rapidly receives signals from the network.

Note that in the embodiments described above, each unit is configured using hardware, but instead may be configured using a program for causing an information processor (CPU) to execute the operation processing described above. In this case, functions and operations similar to those in the embodiments described above are implemented by a processor that operates based on the program stored in a program memory.

Figure 13:
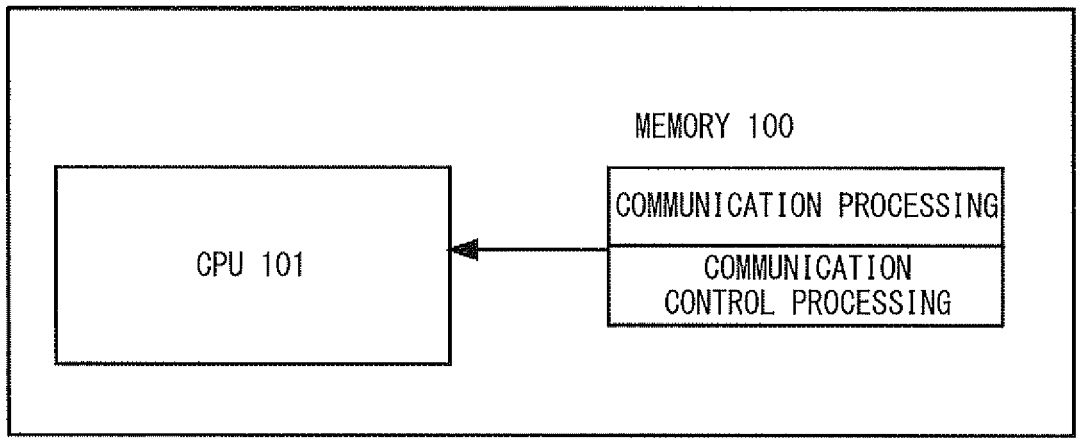
FIG. 13 is a diagram showing another aspect of a wireless terminal 1 in the wireless communication system according to the present embodiment.

For example, in the wireless terminal 1, as shown in FIG. 13, the functions and operations can be implemented by a computer system including a memory 100 and a CPU 101. In this case, the memory 100 stores programs for processing corresponding to the above-described communication processing unit 4 and communication control unit 5. The CPU 101 executes the programs stored in the memory 100, thereby implementing the functions of the communication processing unit 4 and the communication control unit 5.

Figure 14:
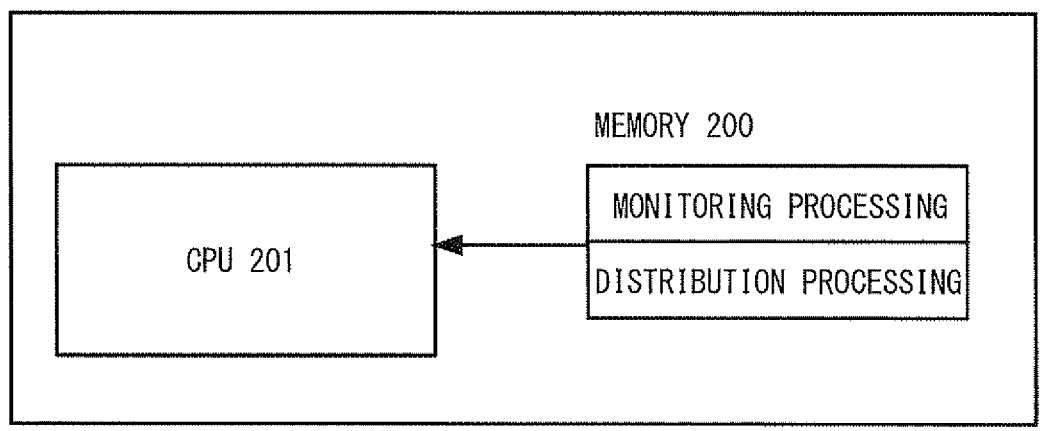
FIG. 14 is a diagram showing another aspect of each of a base station and a wireless network in the wireless communication system according to the present embodiment.

The base station and wireless network including the monitoring unit 2 and the distribution unit 3 can also be implemented by a computer system including a memory 200 and a CPU 201 as shown in FIG. 14. In this case, the memory 200 stores programs for processing corresponding to the above-described monitoring unit 2 and the distribution unit 3. The CPU 201 executes the programs stored in the memory 200, thereby implementing the functions of the monitoring unit 2 and the distribution unit 3.

The whole or part of the exemplary embodiments disclosed above can be described as, but not limited to, the following supplementary notes.

[Supplementary Note 1]

A wireless communication system that enables a wireless terminal to perform communication using a plurality of component carriers having different frequencies, the wireless communication system including:

monitoring means for monitoring a communication state of each of the component carriers allocated to the wireless terminal;

distribution means for distributing, to the component carriers, data to be transmitted, based on the communication state of each of the component carriers;

communication processing means for receiving data by each of the component carriers allocated to the wireless terminal; and communication control means for causing the communication processing means to start a reception operation at a predetermined timing in a non-reception period of a second cycle during a discontinuous reception operation at the second cycle in some of the component carriers allocated to the wireless terminal, and to perform the reception operation a predetermined number of times, the second cycle being longer than a first cycle.

[Supplementary Note 2]

The wireless communication system according to Supplementary note 1, in which the communication control means causes the communication processing means to start a data reception operation at a timing of the first cycle during the non-reception period of the second cycle.

[Supplementary Note 3]

The wireless communication system according to Supplementary note 1 or 2, in which when data is received during the data reception operation performed during the non-reception period of the second cycle by the communication processing means, the communication control means causes a discontinuous reception operation for the communication processing means to transit from the second cycle to the first cycle.

[Supplementary Note 4]

The wireless communication system according to any one of Supplementary notes 1 to 3, in which the communication control means causes the communication processing means to perform a data reception operation for a certain period at a timing when the non-reception period of the second cycle before the period of the data reception operation is equal to the non-reception period of the second cycle after the period of the data reception operation.

[Supplementary Note 5]

The wireless communication system according to any one of Supplementary notes 1 to 4, in which the first cycle corresponds to ShortDRX and the second cycle corresponds to LongDRX.

[Supplementary Note 6]

A wireless communication network in a wireless communication system that enables a wireless terminal to perform communication using a plurality of component carriers having different frequencies, the wireless communication network including: monitoring means for monitoring a communication state of each of the component carriers allocated to the wireless terminal; and distribution means for distributing, to the component carriers, data to be transmitted, based on the communication state of each of the component carriers.

[Supplementary Note 7]

A wireless terminal capable of performing communication using a plurality of component carriers having different frequencies, the wireless terminal including: communication processing means for receiving data by each of the component carriers allocated to the wireless terminal; and communication control means for causing the communication processing means to start a reception operation at a predetermined timing in a non-reception period of a second cycle during a discontinuous reception operation at the second cycle in some of the component carriers allocated to the wireless terminal, and to perform the reception operation a predetermined number of times, the second cycle being longer than a first cycle.

[Supplementary Note 8]

The wireless terminal according to Supplementary note 7, in which the communication control means causes the communication processing means to start the data reception operation at a timing of the first cycle during the non-reception period of the second cycle.

[Supplementary Note 9]

The wireless terminal according to Supplementary note 7 or 8, in which when data is received during the data reception operation performed during the non-reception period of the second cycle by the communication processing means, the communication control means causes a discontinuous reception operation for the communication processing means to transit from the second cycle to the first cycle.

[Supplementary Note 10]

The wireless terminal according to any one of Supplementary notes 7 to 9, in which the communication control means causes the communication processing means to perform a data reception operation for a certain period at a timing when the non-reception period of the second cycle before the period of the data reception operation is equal to the non-reception period of the second cycle after the period of the data reception operation.

[Supplementary Note 11]

The wireless terminal according to any one of Supplementary notes 7 to 10, in which the first cycle corresponds to ShortDRX and the second cycle corresponds to LongDRX.

[Supplementary Note 12]

A wireless communication method that enables a wireless terminal to perform communication using a plurality of component carriers having different frequencies, the wireless communication method including: monitoring, by a wireless communication network, a communication state of each of the component carriers allocated to the wireless terminal; distributing, by the wireless communication network, data to be transmitted, to the component carriers, based on the communication state of each of the component carriers and transmitting the data distributed to the component carriers; and starting, by the wireless terminal, a reception operation at a predetermined timing in a non-reception period of a second cycle during a discontinuous reception operation at the second cycle in some of the component carriers allocated, and performing the reception operation a predetermined number of times, the second cycle being longer than a first cycle.

[Supplementary Note 13]

The wireless communication method according to Supplementary note 12, in which the wireless terminal starts the data reception operation at a timing of the first cycle during the non-reception period of the second cycle.

[Supplementary Note 14]

The wireless communication method according to Supplementary note 12 or 13, in which when data is received during the data reception operation performed during the non-reception period of the second cycle, the wireless terminal transits from the second cycle to the first cycle to perform a discontinuous reception operation.

[Supplementary Note 15]

The wireless communication method according to any one of Supplementary notes 12 to 14, in which the wireless terminal performs a data reception operation for a certain period at a timing when the non-reception period of the second cycle before the period of the data reception operation is equal to the non-reception period of the second cycle after the period of the data reception operation.

[Supplementary Note 16]

The wireless communication method according to any one of Supplementary notes 12 to 15, in which the first cycle corresponds to ShortDRX and the second cycle corresponds to LongDRX.

[Supplementary Note 17]

A wireless communication system that enables a wireless terminal to perform communication using a plurality of component carriers having different frequencies, the wireless communication system including a wireless network device and a wireless terminal, in which the wireless network device includes a memory and a processor, the processor executes:

monitoring processing for monitoring a communication state of each of the component carriers allocated to the wireless terminal; and distribution processing for distributing, to the component carriers, data to be transmitted, based on the communication state of each of the component carrier, the wireless terminal includes a memory and a processor, and the processor executes:

communication processing for receiving data by each of the component carriers allocated to the wireless terminal; and communication control processing for controlling the communication processing in such a manner that a reception operation is started at a predetermined timing in a non-reception period of a second cycle during a discontinuous reception operation at the second cycle in some of the component carriers allocated to the wireless terminal in the communication processing, the second cycle being longer than a first cycle.

[Supplementary Note 18]

The wireless communication system according to Supplementary note 17, in which the communication control processing includes controlling the communication processing to start a data reception operation at a timing of the first cycle during the non-reception period of the second cycle.

[Supplementary Note 19]

The wireless communication system according to Supplementary note 17 or 18, in which the communication control processing includes controlling the communication processing in such a manner that when data is received during the data reception operation performed in the non-reception period of the second cycle by the communication processing, a discontinuous reception operation is caused to transit from the second cycle to the first cycle.

[Supplementary Note 20]

The wireless communication system according to any one of Supplementary notes 17 to 19, in which the communication control processing includes controlling the communication processing in such a manner that a data reception operation is performed for a certain period at a timing when the non-reception period of the second cycle before the period of the data reception operation is equal to the non-reception period of the second cycle after the period of the data reception operation.

[Supplementary Note 21]

The wireless communication system according to any one of Supplementary notes 17 to 20, in which the first cycle corresponds to ShortDRX and the second cycle corresponds to LongDRX.

[Supplementary Note 22]

A wireless communication network device in a wireless communication system that enables a wireless terminal to perform communication using a plurality of component carriers having different frequencies, the wireless communication network device including a memory and a processor, in which the processor executes:

monitoring processing for monitoring a communication state of each of the component carriers allocated to the wireless terminal; and distribution processing for distributing, to the component carriers, data to be transmitted, based on the communication state of each of the component carrier.

[Supplementary Note 23]

A wireless terminal capable of performing communication using a plurality of component carriers having different frequencies, the wireless terminal including a memory and a processor, in which the processor executes:

communication processing for receiving data by each of the component carriers allocated to the wireless terminal; and the communication processing for performing control in such a manner that a reception operation is started at a predetermined timing in a non-reception period of a second cycle during a discontinuous reception operation at the second cycle in some of the component carriers allocated to the wireless terminal, and to perform the reception operation a predetermined number of times, the second cycle being longer than a first cycle.

The present invention has been described above with reference to preferred embodiments. However, the present invention is not limited to the embodiments described above and can be modified in various manners within the scope of the technical idea of the present invention.

REFERENCE SIGNS LIST

1 WIRELESS TERMINAL
2 MONITORING UNIT
3 DISTRIBUTION UNIT
4 COMMUNICATION PROCESSING UNIT
5 COMMUNICATION CONTROL UNIT
10 UE
20 eNB
11 RECEIVER
12 TRANSMITTER
13 SIGNAL PROCESSING UNIT
14 COMMUNICATION CONTROL UNIT
21 RECEIVER
22 TRANSMITTER
23 SIGNAL PROCESSING UNIT
24 COMMUNICATION CONTROL UNIT
25 TERMINAL MANAGEMENT UNIT
100 MEMORY
101 CPU
200 MEMORY
201 CPU

The invention claimed is:

1. A wireless communication system that enables a wireless terminal to perform communication using a plurality of component carriers having different frequencies, the wireless communication system comprising:

first hardware, including a first processor and a first memory;

wherein the first hardware is configured to implement a monitoring unit that monitors a communication state of each of the component carriers allocated to the wireless terminal, wherein the first hardware is configured to implement a distribution unit that distributes, to the component carriers, data to be transmitted, based on the communication state of each of the component carriers; and second hardware, including a second processor and a second memory;

wherein the second hardware is configured to implement a communication processing unit that receives data by each of the component carriers allocated to the wireless terminal, and wherein the second hardware is configured to implement a communication control unit that causes the communication processing unit to start a reception operation at a predetermined timing in a non-reception period of a second cycle during a discontinuous reception operation at the second cycle in some of the component carriers allocated to the wireless terminal, and to perform the reception operation a predetermined number of times, the second cycle being longer than a first cycle.

2. The wireless communication system according to claim 1, wherein the communication control unit causes the communication processing unit to start a data reception operation at a timing of the first cycle during the non-reception period of the second cycle.

3. The wireless communication system according to claim 1, wherein if data is received during the data reception operation performed during the non-reception period of the second cycle by the communication processing unit, the communication control means causes a discontinuous reception operation for the communication processing means to transit from the second cycle to the first cycle.

4. The wireless communication system according to claim 1, wherein the communication control unit causes the communication processing unit to perform a data reception operation for a certain period at a timing if the non-reception period of the second cycle before the period of the data reception operation is equal to the non-reception period of the second cycle after the period of the data reception operation.

5. The wireless communication system according to claim 1, wherein the first cycle corresponds to ShortDRX and the second cycle corresponds to LongDRX.

6. A wireless terminal capable of performing communication using a plurality of component carriers having different frequencies, the wireless terminal comprising:
hardware, including a processor and a memory,
wherein the hardware is configured to implement a communication processing unit that receives data by each of the component carriers allocated to the wireless terminal, and
wherein the hardware is configured to implement a communication control unit that causes the communication processing unit to start a reception operation at a predetermined timing in a non-reception period of a second cycle during a discontinuous reception operation at the second cycle in some of the component carriers allocated to the wireless terminal, and to perform the reception operation a predetermined number of times, the second cycle being longer than a first cycle.

7. The wireless terminal according to claim 6, wherein the communication control unit causes the communication processing unit to start a data reception operation at a timing of the first cycle during the non-reception period of the second cycle.

8. The wireless terminal according to claim 6, wherein if data is received during the data reception operation performed during the non-reception period of the second cycle by the communication processing unit, the communication control unit causes a discontinuous reception operation for the communication processing unit to transit from the second cycle to the first cycle.

9. The wireless terminal according to claim 6, wherein the communication control unit causes the communication processing unit to perform a data reception operation for a certain period at a timing if the non-reception period of the second cycle before the period of the data reception operation is equal to the non-reception period of the second cycle after the period of the data reception operation.

10. The wireless terminal according to claim 6, wherein the first cycle corresponds to ShortDRX and the second cycle corresponds to LongDRX.

11. The wireless terminal according to claim 6, wherein the second cycle occurs in a different component carrier than the first cycle.

12. The wireless terminal according to claim 6, wherein the second cycle overlaps with the first cycle in time.

13. The wireless terminal according to claim 6, wherein the predetermined timing occurs during the non-reception period of the second cycle.

* * * * *